(12) United States Patent
Adkins et al.

(10) Patent No.: US 7,739,198 B2
(45) Date of Patent: Jun. 15, 2010

(54) SYSTEM AND METHOD FOR REMOTELY AUTHENTICATING A DEVICE IN A REWARD PROGRAM

(75) Inventors: Christopher A. Adkins, Lexington, KY (US); Israel Bautista, Cebu (PH); Jonathan M. Gumaroy, Cebu (PH); Michelle Medina, Bacolod (PH)

(73) Assignee: Lexmark International, Inc., Lexington, KY (US)

( * ) Notice: Subject to any disclaimer, the term of this patent is extended or adjusted under 35 U.S.C. 154(b) by 745 days.

(21) Appl. No.: 11/461,236

(22) Filed: Jul. 31, 2006

(65) Prior Publication Data

US 2008/0027875 A1      Jan. 31, 2008

(51) Int. Cl.
*G06Q 20/00* (2006.01)
(52) U.S. Cl. .............................. 705/76; 705/50; 705/51
(58) Field of Classification Search .................. 705/76, 705/50, 51
See application file for complete search history.

(56) References Cited

U.S. PATENT DOCUMENTS

| | | | |
|---|---|---|---|
| 7,362,862 B2 * | 4/2008 | Schneier et al. ............. | 380/251 |
| 2003/0018579 A1 * | 1/2003 | Litster et al. .................. | 705/40 |
| 2004/0187012 A1 * | 9/2004 | Kohiyama et al. ........... | 713/193 |
| 2005/0198217 A1 * | 9/2005 | Nguyen et al. ............... | 709/220 |
| 2009/0070583 A1 * | 3/2009 | von Mueller et al. ......... | 713/168 |
| 2009/0083372 A1 * | 3/2009 | Teppler ....................... | 709/203 |

* cited by examiner

*Primary Examiner*—Pierre E Elisca

(57) ABSTRACT

A reward program directed to registering computer devices and their consumable parts via a computer network generates a unique key code value for each computer device. The key code is generated by a remote server in the computer network and may include appending a sequential counter to the serial number of the device being registered. The key code is then encrypted using a standard hash algorithm. The encrypted key code is saved in a device information database together with other device information and consumable part information related to the computer device. The encrypted key code is also returned to the computer device and saved in the device memory. The device information database is updated with the usage of consumable part information for each registered computer device. Customers also register with the reward program and are assigned to one or more registered computer devices.

17 Claims, 4 Drawing Sheets

SYSTEM AND METHOD FOR REMOTELY AUTHENTICATING A DEVICE IN A REWARD PROGRAM

BACKGROUND

1. Field of the Invention

The present invention relates generally to systems and methods for remotely authenticating a computer device connected to a computer network, and in particular, to remote authentication systems and methods that generate unique identifiers for computer devices connected to a computer network.

2. Description of the Related Art

In the prior art, computer vendors often use reward programs for drawing customers to buy and use various computer devices, such as printers, scanners, multi-function printers, facsimiles, or other similar hardware devices connected to one or more computers. A reward program typically provides a registered customer a certain number of points for each consumable part or supply item, such as ink cartridges and paper, purchased for a specific device. As the points accumulate, the customer may redeem the points for free or special-priced products and/or services. Therefore, a reward program increases customer satisfaction and encourages customers to purchase additional products from the vendors which in turn, increases customer loyalty.

When implementing a reward program for computer devices, it is important for the reward program to be efficient and seamless to a customer. Therefore, there is a need for a reward program to maintain information on a customer and the customer's computer devices over a computer network such as the Internet. Furthermore, when implementing a reward program over such a computer network, data integrity is very important to assess correct and accurate information for each participating, or registered, customer. Data integrity also protects the vendor's business interests and practices by detecting and preventing access to the reward program by individuals with fraudulent purposes. There are certain individuals that could modify and alter information being sent to the vendor's server on the computer network Such possible taking of customer information and stealing it for themselves affects the vendor's relationship with its customers. As a result, a reward program implemented over a computer network like the Internet must be secure in handling customer information.

There have been numerous ways for securing customer data being transmitted over the Internet for a reward program, including assigning a random customer identifier or using the computer device's serial number, both of which provide a unique identifier for each customer in a reward program. A unique customer identifier is a good solution to use when each customer can only use one computer and the devices connected to that computer. Thus, when a customer accesses the reward program for a certain device (printer), the reward program retrieves the unique customer identifier from the customer's computer or connected device. From the customer identifier, the reward program automatically knows that the computer device is dedicated to a specific customer. However, this solution is compromised if the customer must transfer the connection of the same device to another computer. Then, when the client application on the new computer attempts to connect to the reward program, the new client application does not have access to the unique customer identifier (which is stored on the old computer), resulting in the reward program generating a new customer identifier for the same customer and same device. Thus, each customer identifier is dependent on the computer or device where it is saved. Alternatively, if the customer identifier is readable to the customer, then a customer or unwanted third party may tamper with the customer identifier or with the reward program database.

Using the device's serial number as the unique identifier within a rewards program is an easy implementation because each computer device's serial number is readable at all times. However, this is a problem if many users are using the device, such as a printer at an Internet café. Multiple people other than the rightful owner of the device may attempt to register the device under the vendor's reward program. Thus, points for using the device or purchasing consumable parts, such as ink cartridges, for the device may be wrongfully allocated to other users. In addition, using a device's serial number as the unique identifier in a rewards program is a problem because a vendor may inadvertently assign the same serial number to two different devices. Thus, one customer may be prevented from registering in the reward program because the device's serial number has already been assigned to a prior customer.

Therefore, there is a need for a reward program that is accessible and operable over a computer network, such as via the Internet, that provides customers with a unique system and method for identifying each customer with a specific computer device. There is further need for such a system and method for identifying each customer with a specific computer device regardless of how the computer device is connected to, or moved within the computer network. There is still a further need for a system and method for identifying each customer with a specific computer device wherein the identification means is hidden from and inaccessible by a customer.

SUMMARY OF THE INVENTION

The problems associated with a conventional reward program directed to registering computer devices e.g., printers and their consumable parts, e.g., ink cartridges via a computer network are solved by generating a unique key code value for each computer device to be registered remotely in the reward program. Each time a new computer device is added to the reward program database, a device information database, a unique key code is generated. The key code is generated by a remote server in the computer network and may include appending a sequential counter to the serial number of the device being registered. The key code is then encrypted using a standard hash algorithm. After being generated, the encrypted key code is saved in the device information database together with other device information and consumable part information related to the computer device. The encrypted key code is also returned to the computer device and saved in the device memory.

The system and method of the present invention automatically generates encrypted key codes and registers newly installed computer devices. Similarly, as registered computer devices consume its consumable parts, the device information database is automatically updated with such usage. Also, the system and method of the present invention enable customers to register with the reward program via a vendor's web site wherein a customer may associate himself with or is assigned to one or more previously registered computer devices.

The present system and method enable a computer device to be registered within the reward program to more than one customer such that as each customer uses and orders consumable parts, the appropriate customer is awarded redeemable points. In addition, the present system and method handle the inadvertent problem of two separate computer devices having the same serial number. Furthermore, the present system and method provides a secure means for maintaining encrypted key codes for the various computer devices registered within the reward program.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Figure 1:
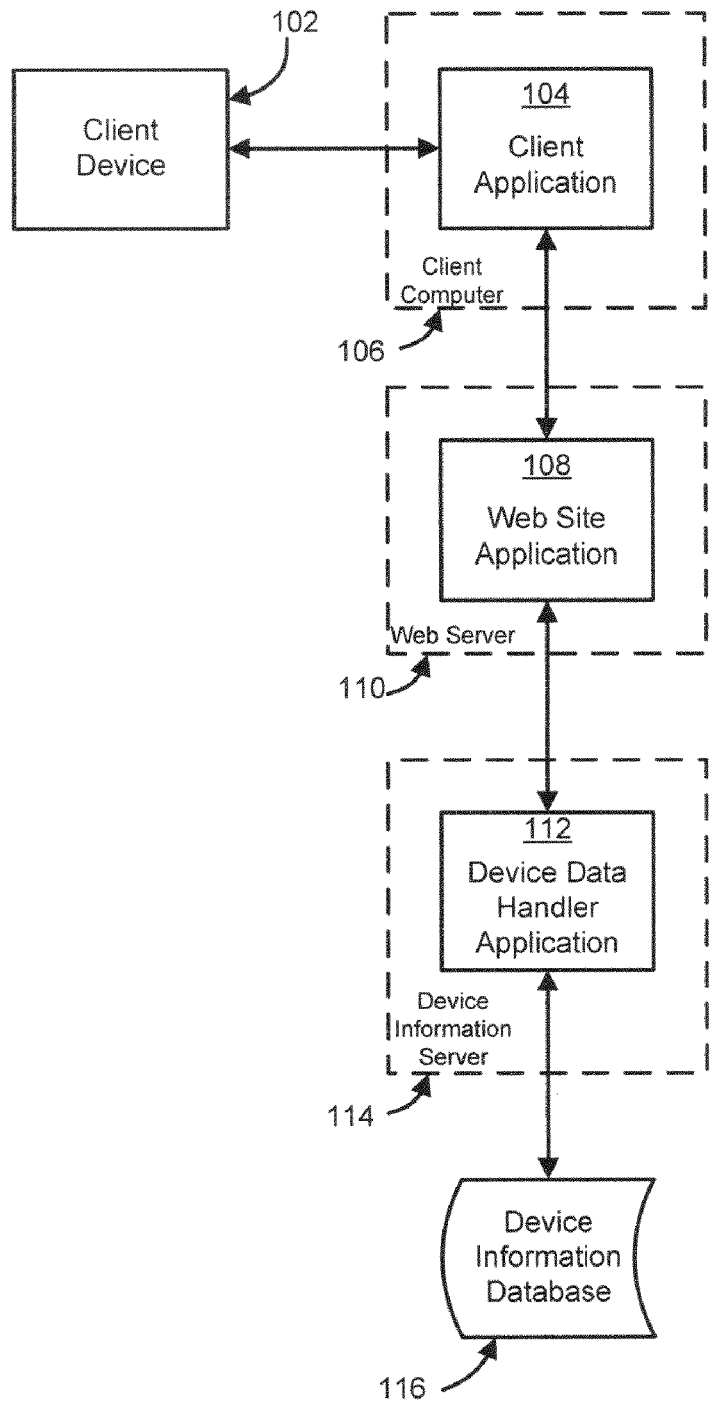
FIG. 1 is a block diagram illustrating the components of the present system and method.

It is to be understood that the invention is not limited in its application to the details of construction and operation, and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use herein of "including" "comprising," or "having" and variations thereof is meant to encompass the items listed thereafter and equivalents thereof as well as additional items. In addition, it should be understood that embodiments of the present invention were implemented solely in software, but this is for convenience, and the embodiments of the present invention may also be implemented in hardware, firmware or a combination of hardware, firmware and/or software.

FIG. 1 is a block diagram illustrating the components of the present invention. A client device 102 is connected by conventional means to a client computer 106. A client device 102 may be a printer, scanner, multi-function printer, facsimile, or similar hardware unit. A client application 104 is a software program residing and executing on the client computer 106 and is designed to communicate with the client device 102 and a device data handler application 112 on a device information server 114 remotely located from the client computer 106 over a computer network The client application 104 is a standalone software application. Alternatively, the client application 104 may reside in firmware, invoked by a device driver of the client device 102 during an installation of the client device 102 and when the device driver detects a need for replacing a consumable part of the client device 102. For example, if the client device 102 is a printer, the device driver initiates the client application 104 when the device driver detects that the printer (i.e., the client device 102) is being installed or has a low-ink status such that a new ink cartridge, a consumable part, is needed. The client computer 106 may be a conventional personal computer or MacIntosh (Apple) machine. The client computer 106 may also be any other device suitable for attachment to a client device 102, such as a personal digital assistant or handheld device.

The client application 102 communicates over the computer network, such as the Internet, through a web site application 108 executing on a web server 110, such as an Apache web server. The client application 102 uses a standard secured socket layer (SSL) over a standard HTTP protocol in its communication with the web server 110.

The web site application 108 accepts web connections for any automatic and manual operations originating from the client computer 106 and creates HTML pages for all connecting clients on the computer network that access a rewards program web site hosted by the web server 110. The web site application 108 also uses a conventional web browser on the web server 110 for displaying the HTML pages and retrieving user, or customer, input to those HTML pages. The web site application 108 also has a TCP/IP connection to a device data handler application 112 executing on a device information server 114.

The device data handler application 112 is a standalone application that executes on a device information server 114, such as a Sun workstation, and serves as an interface between the web site application 108 and the device information database 116. Thus, the device data handler application 112 receives and executes all database requests. The device information database 116 uses the Oracle 10 g application which allows multiple connections to the device information database 116 from the device information server 114 when many clients, or reward program customers, concurrently use the reward program website hosted by the web server 110.

Figure 2:
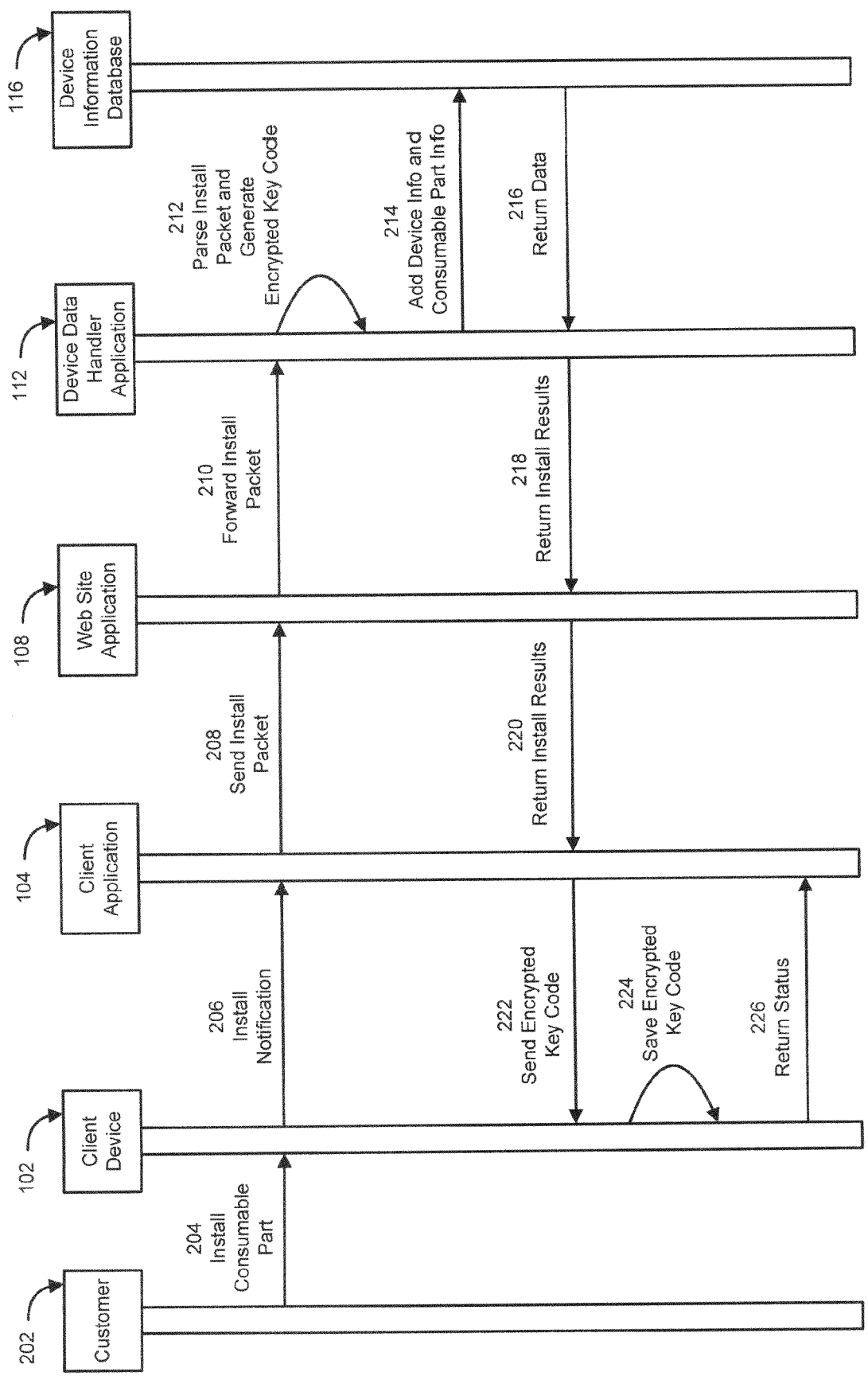
FIG. 2 is an operational flow diagram illustrating the registration of a device in the rewards program of the present invention.

FIG. 2 is an operational flow diagram illustrating the registration of a customer's 202 client device 102 in a vendor's rewards program. This process is intended to execute in the background such that it is transparent to the customer 202. This process also operates prior to the customer 202 actually registering for the rewards program via the web site application 108 detailed below with FIG. 3.

A customer 202 starts the process by installing a new client device 102, such as a printer, to the client computer 106 and a new consumable part 204, such as an ink cartridge, in that client device 102. Upon receipt of the new consumable part 204, the device driver for the client device 102 sends an install notification 206 to the client application 104 executing on the client computer 106. The client application 104 in turn generates and sends an install packet 208 to the web site application 108 executing on the web server 110. In one embodiment, the install packet 208 contains both device information as well as consumable part information. For example, the device information contains, but is not limited to, the device serial number or identification code, device model, and current date/time stamp. The consumable part information includes, but is not limited to, a consumable part type and serial number, installation date, consumption rate, and the fusemap memory from the client device 102. Thus, the install packet contains all of the information needed to identify the client device 102 and the type of consumable part.

In an alternative embodiment, if the client application 104 is not connected to the computer network, or Internet, at the time it receives the install notification from the client device 102, the client application 104 stores the install notification and the related install packet data for transmission at a later date. That is, whenever the client application 104 connects to the computer network, it will transmit all install notifications and related install packets that have been queued since the last connection.

Upon receipt of the data, the web site application 108 forwards the install packet 210 to the device data handler application 112 executing on the device information server 114. The device data handler application 112 parses the install packet 212 into its various data definitions, such as device serial number and consumable part product type and number. The device data handler application 112 accesses the device information database 116 to determine whether the device serial number contained in the install package has already been entered into the device information database 116. The device data handler application 112 uses the results of the inquiry in the generation of a key code for the client device 102. The key code is a unique identifier for referencing the client device 102 newly installed with the client computer 106.

The key code for a client device 102 is the device serial number. Then, upon the second attempt to register a client device 102 having the same device serial number, the key code is the device serial number with a sequential incremental counter appended thereto. The counter starts at "1" for the second occurrence of the client device 102. Then, upon the third attempt to register a client device 102 having the same device serial number, the key code is the device serial number with the counter "3" appended thereto. The counter for generating a key code for each subsequent occurrence of the same device serial number is sequentially incremented from the previous counter. For example, if a client device has a serial number of 74892, the first registration of this device serial number results in a key code of 74892. Then the next attempt to register that device serial number results in a key code of 748921, then the next attempt results in a key code of 748922, and so on. It is important to note that in each of these registrations, the client device 102 does not have a valid encrypted key code stored in its memory.

Therefore, operationally if the device data handler application 112 determines that the device serial number does not exist in the device information database 116, then the device data handler application 112 knows that this is a new client device 102 not previously stored in the device information database 116. The device data handler application 112 generates a key code equal to the device serial number. However, if the device serial number does exist in the device information database 116, then the device data handler application 112 knows that this is not a new client device 102 and that this client device 102 has previously been registered in the reward program and entered into the device information database 116. The device data handler application 112 determines the last counter number used for the given device serial number, increments it by one, and appends it to the device serial number to generate a unique key code.

Once the device data handler application 112 generates a key code for the client device 102, the device data handler application 112 inputs that key code into a standard hash algorithm to create an encrypted key code. One embodiment uses a standard HMAC algorithm resulting in an encrypted key code having a minimum of 16 bits and a maximum of 160 bits.

The device data handler application 112 then accesses the device information database 116 and adds device information and consumable part information 214 to the database 116. In particular, the device information contains, but is not limited to, the device serial numbers, device model, and current date as noted above, along with the encrypted key code. The consumable part information includes, but is not limited to, a consumable part type and serial number, device serial number, installation date, consumption rate, and the fusemap memory from the client device, as also noted above. The device information database 116 returns status data 216 to the device data handler application 112 indicating whether the update to the device information database 116 was successful or not.

Once the information is stored in the device information database 116 and the status returned, the device data handler application 112 returns install results 218 to the web site application 108, which in turn returns the install results 220 to the client application 104. The install results contain a status code indicating whether the client device 102 was properly added to the device information database 116 and possibly the encrypted key code. For example, the status code may have the possible values: 0=successful, 1=successful and encrypted key code follows, or −1=database error. The client application 104 parses the status code of the install results, and if the installation process was successful, the client application 104 sends the encrypted key code 222 to the client device 102. The encrypted key code is then saved to the client device's 102 RAM memory 224. In an alternate embodiment, the encrypted key code may be stored in the registry of the client computer 106. The client device 102 sends a status of the save operation back to the client application 104 indicating whether the save to the client device's 102 memory was successful or not.

In an alternative embodiment, if the client application 104 is not connected to the computer network, or Internet, at the time the web site application 108 receives the install results from the device data handler application 112, the web site application 108 stores the install results for transmission at a later date. That is, whenever the client application 104 connects to the network, the web site application 108 will transmit all install results that have been queued since the last connection.

Figure 3:
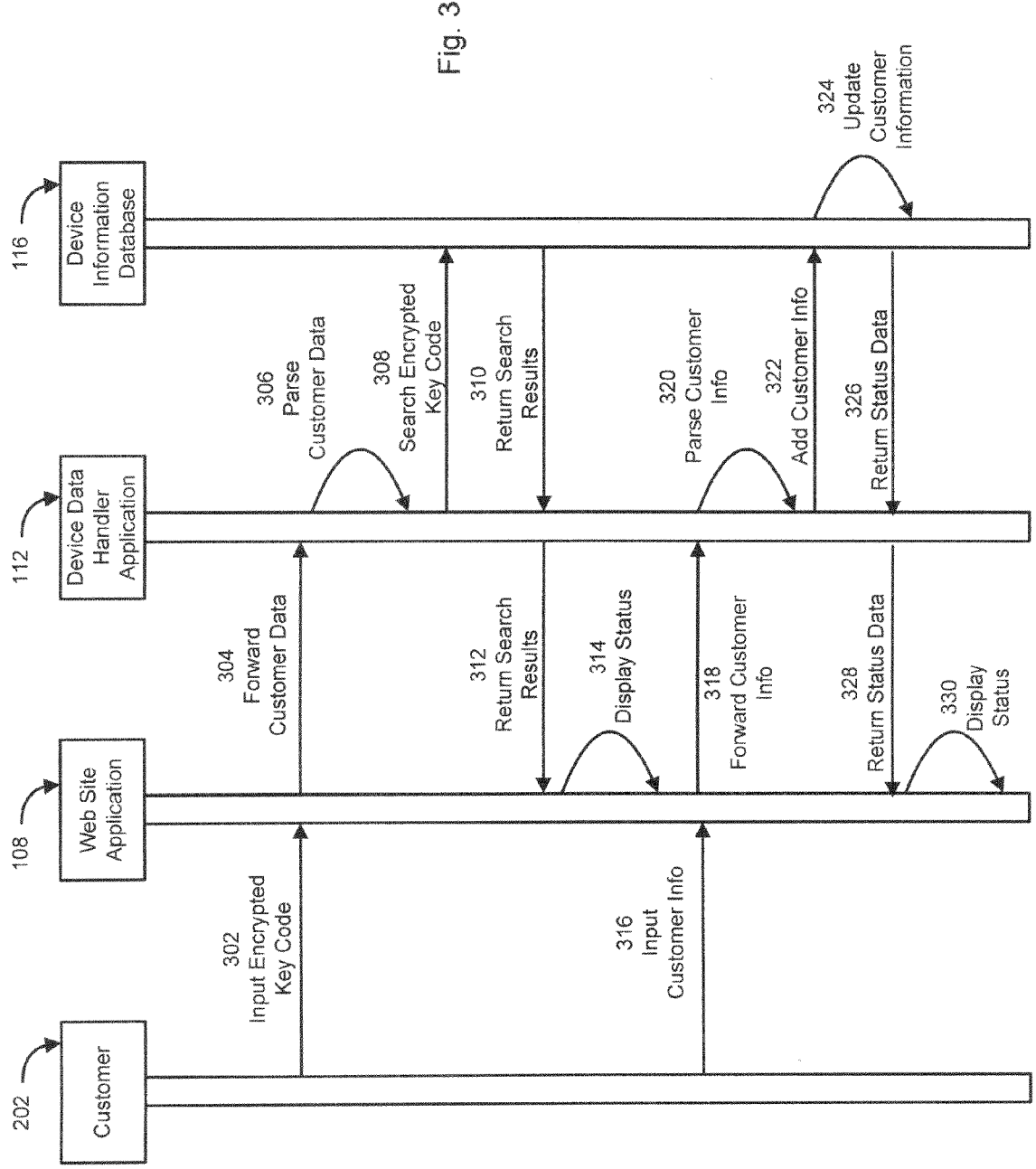
FIG. 3 is an operational flow diagram illustrating the registration of a customer to a device in the reward program of the present invention.

FIG. 3 is an operational flow diagram illustrating the registration of a customer 202 to a specific client device 102 in the rewards program of the vendor of the client device 102. In operation, the customer 202 goes to the web site for the vendor, such as Lexmark International, Inc., of the client device 102, e.g., a printer, to register with the Vendor's reward program. As described earlier, the rewards program provides a registered customer with point awards which can be redeemed for coupon saves, rebates, and/or special purchasing deals.

The customer 202 starts the process by entering the vendor's web site wherein a web browser managing the vendor's web site invokes the web site application 108. The web browser is not shown on FIG. 3 for convenience purpose only since the use and operation of web browsers are well known in the relevant art. Upon entering the vendor's web site, the web site application 108 displays a registration window to the customer 202 which prompts the customer 202 to input the encrypted key code 302 for the client device 102 that the customer 202 wants to register for the rewards program. In one embodiment, an applet is executed which reads the encrypted key code from the client device 102 and automatically inputs it into the text field of the registration window on the vendor's web site. Upon selecting the "submit" soft button on the registration window, the encrypted key code is forwarded as customer data 304 to the device data handler application 112. Alternatively, if the client device 102 does not have a stored encrypted key code when the customer 202 enters the vendor's web site, processing proceeds as described above with FIG. 2 wherein the system automatically registers the client device 102 within the device information database 116 and vendor's reward program.

The device data handler application 112 parses the customer data into its different fields 306, including, but not limited to, the encrypted key code, server identifier, date and time stamps, and the like. The device data handler application 112 uses the encrypted key code to search 308 the device information database 116 to determine whether the associated client device 102 has already been entered into the reward program. The device data handler application 112 receives the returned search results 310 from the device information database 116, which in one embodiment is a "0" if the encrypted key code is found in the device information database 116 and is a "1" if the encrypted key code is not found in the device information database 116. The device data handler application 112 forwards the return search results 312 to the web site application 108 for further processing.

Upon receipt, the web site application 108 generates a specific HTML web page corresponding to the return search results. The web site application 108 sends the specific HTML page to the web browser for display 314 to the customer 202. If the search results are that the encrypted key code exists in the device information database 116, indicating that the client device 102 has been registered previously with the vendor's rewards program, the HTML page prompts the customer 202 to associate the client device 102 with an existing customer account or to create a new customer account.

Returning to the display 314 of the search results status to the customer 202, if the search results are that the encrypted key code does not exist in the device information database 116, the HTML page informs the customer 202 that the client device 102 has not been registered previously with the vendor's rewards program and prompts the user as to whether the customer 202 wants to so register the client device 102. If the customer 202 selects not to register the client device 102, processing terminates. If the customer 202 selects to register the client device 102, processing continues as noted above with the web site application 108 generating the HTML page asking the customer 202 whether to associate the client device 102 with an existing customer account or to create a new customer account.

Assuming that the customer 202 does not have an account, the customer 202 selects to create a new account and inputs 316 all of the requested customer 202 information, including, but not limited to, name, address, e-mail address, and optional demographic information such as age, employment, and preferred use of computer equipment. After entering all of the customer information, the web browser forwards the customer information to the web site application 108 which in turn forwards the customer information 318 to the device data handler application 112.

The device data handler application 112 parses the customer information 320 into its respective data definitions. The device data handler application 112 requests the device information database 116 add 322 the customer 202 as a new customer account in the reward program. In its request, the device data handler application 112 provides the new customer account number, total number of reward points, and the encrypted key code for the client device 102. In one embodiment, the new customer account number is simply an incremental or serial counter, while in an alternative embodiment, the new customer account number is a unique randomly generated alphanumeric string. The total number of reward points has a default value of zero if the client device 102 had not been previously entered into the device information database 116. However, if the client device 102 existed in the device information database 116, then the total number of reward points for the new customer account equals the number of reward points previously recorded in the device information database 116 for the client device 102. Once obtained the device information database 116 is updated with this customer information 324.

Status is returned 326 to the device data handler application 112 indicating whether the update of the device information database 116 was successful or not. If successful, the status data includes the new customer account number along with the total number of reward points. If not successful, the status data includes an error message along with any available information as to why the new customer account was not created. The device data handler application 112 forwards the return status data 328 to the web site application 108 which generates the appropriate HTML page. The device data handler application 112 sends the HTML page to the web browser which displays the status 330 to the customer 202.

Returning to the display 314 which prompts the customer 202 to associate the client device 102 with an existing customer account or to create a new customer account if the customer selects to associate the client device 102 with an existing customer account, the web site application 108 generates an HTML page asking the customer to enter a customer account number. The customer 202 inputs the customer information 316 which is an existing customer account number. The web site application 108 forwards the customer information 318 to the device data handler application 112. After parsing the customer information 320, the device data handler application 112 requests the device information database 116 to add the existing customer number such that the client device 102 is now associated with the existing customer account. Processing then continues as described above wherein the client device 102 becomes associated with the given customer account and the reward points for the existing customer account are increased by the amount of the reward points associated with the client device 102.

Figure 4:
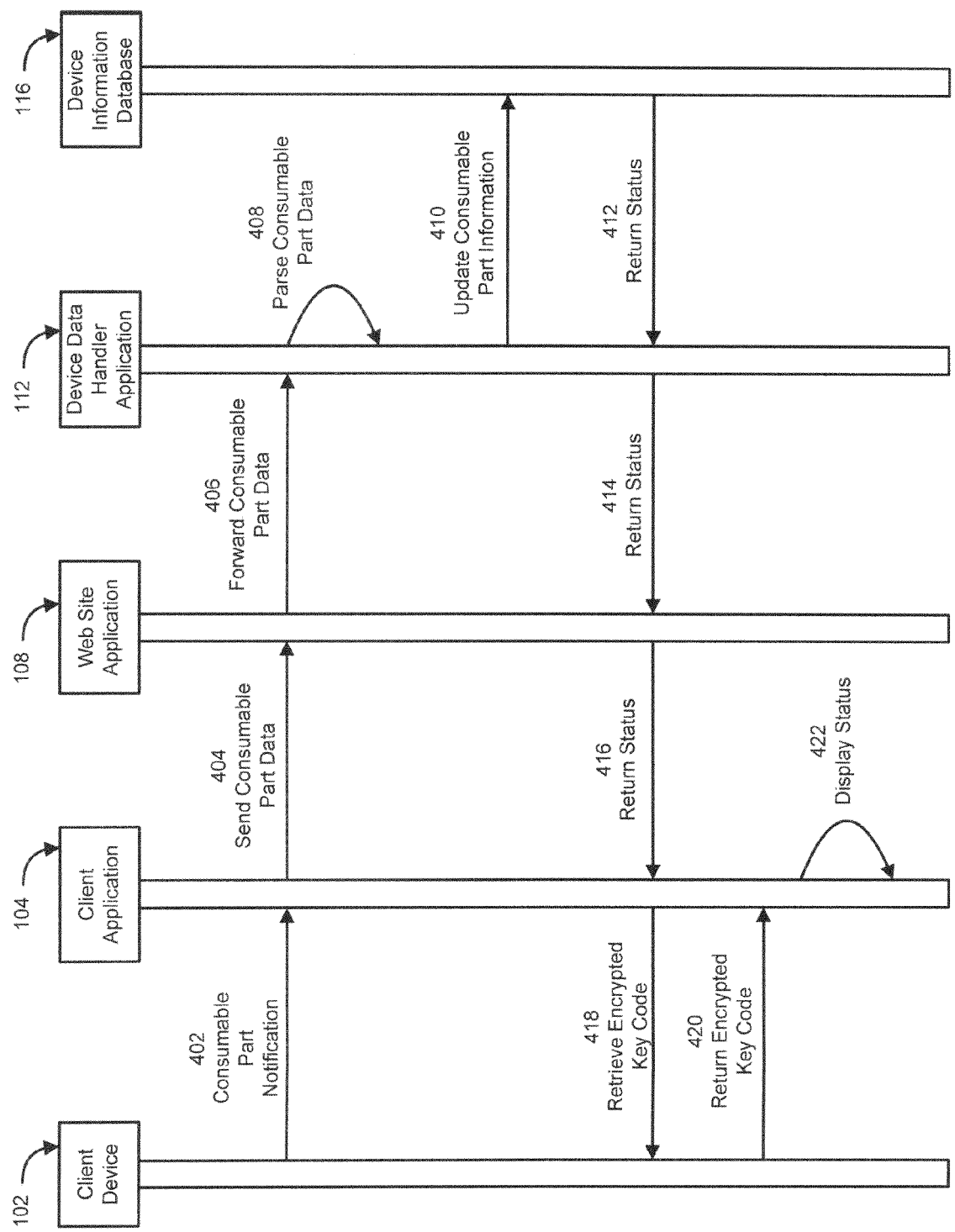
FIG. 4 is an operational flow diagram illustrating the transmission and storing of updated consumable part information for a device in the reward program of the present invention.

FIG. 4 is an operational flow diagram illustrating the transmission and storing of update device consumable part information for a client device 102 in the reward program of the present invention. That is, when a client device 102, such as a printer, requires the replacement of a consumable part, such as an ink cartridge, the system records information about the consumable part for the associated client device 102.

Processing begins when the client device 102 detects that it is low on, or has completely exhausted, a consumable part. The client device 102 sends a consumable part notification 402 to the device driver executing on the client computer 106 which in turn notifies the client application 104. The consumable part notification contains consumable part data which is the encrypted key code stored in the client device's 102 memory as well as information about the consumable part, such as, the client device's fusemap, consumable part type and product number, and a current date/time stamp. Upon receipt, the client application 104 sends the consumable part data 404 to the web site application 108 on the web server 110. If the client computer 106 is not connected to the computer network, then the client application 104 stores the consumable part data for transmission at a later time when the client computer 106 is connected to the computer network.

The web site application 108 forwards the consumable part data 406 to the device data handler application 112 on the device information server 114. Upon receipt, the device data handler application 112 parses the consumable part data 408 into its respective data definitions. The device data handler application 112 then updates the consumable part information 410 in the device information database 116. In particular, the device data handler application 112 uses the encrypted key code to retrieve the client device's 102 record from the device information database 116 and to update the data fields in the record pertaining to the consumable part. The data fields in the retrieved record are overwritten with the new fusemap and date/time stamp if the consumable part type of the retrieved record is the same as the consumable part type sent in the consumable part information from the client device 102 in the notification. Once the device information database 116 is updated, it returns a status 412 to the device data handler application 112 as to whether the update was successful.

The device data handler application 112 then determines whether the current client device 102 has been registered to a specific customer 202. That is, the device data handler application 112 determines if the retrieved record has a customer account associated with it and then returns the appropriate status 414 to the web site application 108. The device data handler application 112 returns a status of "0" if the device information database 116 has been successfully updated and there is a registered customer 202, returns a status of "1" if the device information database 116 has been successfully updated and there is not a registered customer 202, and returns a status of "−1" if there was an error in updating the device information database 116. Upon receipt, the web site application 108 returns the status 416 to the client application 104.

The client application 108 handles the status accordingly. That is, if the returned status 416 indicates that there was a database error, the client application 108 stores the information for re-transmitting it at a later date, such as during the next installation of a client device 102 or the next receipt of a consumable part notification 402. If the returned status 416 indicates that the device information database 116 was successfully updated, the client application 108 queries the client device 102 for the stored encrypted key code 418.

Upon receipt of the encrypted key code 420, the client application 108 displays the status 422 to the customer 202. In particular, the client application 108 opens a window on the client computer 106 and displays the encrypted key code with informative text indicating that the consumable part status has been recorded for the client device 102. If there was not a registered customer 202 for the client device 102, the display window prompts the customer 202 to register the client device 102 at the vendor's web site. See FIG. 3.

Once the consumable part information is properly recorded in the device information database 116, the vendor may use this information in a number of different ways. For example, the vendor may send the customer 202 notices to order new consumable parts while reminding the customer 202 that each order of a new consumable part results in the accumulation of additional redeemable reward points. Also, the vendor may automatically transfer the customer 202 to its HTML page for ordering such consumable parts.

The foregoing description of several methods and an embodiment of the invention has been presented for purposes of illustration. It is not intended to be exhaustive or to limit the present invention to the precise steps and/or forms disclosed, and obviously many modifications and variations are possible in light of the above teaching. It is intended that the scope of the present invention be defined by the claims appended hereto.

What is claimed is:

1. A method for remotely authenticating a device in a reward program, comprising:
   receiving an identification code for a device connected to a computer network;
   generating a key code from said identification code;
   encrypting said key code, thereby generating an encrypted key code;
   transmitting said encrypted key code to said device for storage;
   transmitting said encrypted key code and device consumable part information for said device to a device information database for storage;
   receiving said encrypted key code and update device consumable part information from said device;
   determining if said encrypted key code is stored in said device information database; and
   if said encrypted key code is stored in said device information database, transmitting said update device consumable part information to said device information database wherein said update device consumable part information is associated with said encrypted key code.

2. The method of claim 1, wherein said key code is said identification code.

3. The method of claim 1, wherein said key code is generated by appending a unique identifier to said identification code.

4. The method of claim 3, wherein said unique identifier is a sequential incremental counter.

5. The method of claim 1, wherein said encrypting said key code encrypts said key code with a hash algorithm.

6. The method of claim 1, further comprising:
   assigning a customer identifier and a reward point counter to said encrypted key code; and
   transmitting said customer identifier and said reward point counter to said device information database for storage.

7. The method of claim 6, further comprising:
   increasing said reward point counter of said customer identifier when a device consumable part is purchased by said customer identifier.

8. The method of claim 1, further comprising:
   displaying said update device consumable part information.

9. The method of claim 1, wherein said identification code is the serial number of said device.

10. A system for remotely authenticating a device in a reward program, comprising:
    a means for retrieving an identification code of a device connected to a computer network;
    a means for sending said identification code to a remote processing application;
    a means for generating a key code from said identification code;
    a means for encrypting said key code, thereby generating an encrypted key code;
    a means for storing said encrypted key code in said device;
    a means for storing said encrypted key code and device consumable part information for said device in a device information database in communication with said remote processing application;
    a means for sending said encrypted key code and update device consumable part information from said device to said remote processing application;
    a means for determining if said encrypted key code is stored in said device information database; and
    if said encrypted key code is in said device information database a means for storing said update device consumable part information in said device information database wherein said update device consumable part information is associated with said encrypted key code.

11. The system of claim 10, wherein said generating comprises setting said identifier code as said key code.

12. The system of claim 11, wherein said means for generating said key code generates said key code by appending a unique identifier to said identification code.

13. The system of claim 11, wherein said unique identifier is a sequential incremental counter.

14. The system of claim 10, wherein said means for encrypting said key code encrypts said key code with a hash algorithm.

15. The system of claim 10, further comprising:
- a means for assigning a customer identifier and a reward point counter to said encrypted key code in said device information database; and
- a means for transmitting said customer identifier and said reward point counter to said device information database for storage.

16. The system of claim 15, further comprising:
- a means for increasing said reward point counter of said customer identifier when a device consumable part is purchased by said customer identifier.

17. The system of claim 10, further comprising:
- a means for displaying said update device consumable part information.

* * * * *